United States Patent Office 2,700,602
Patented Jan. 25, 1955

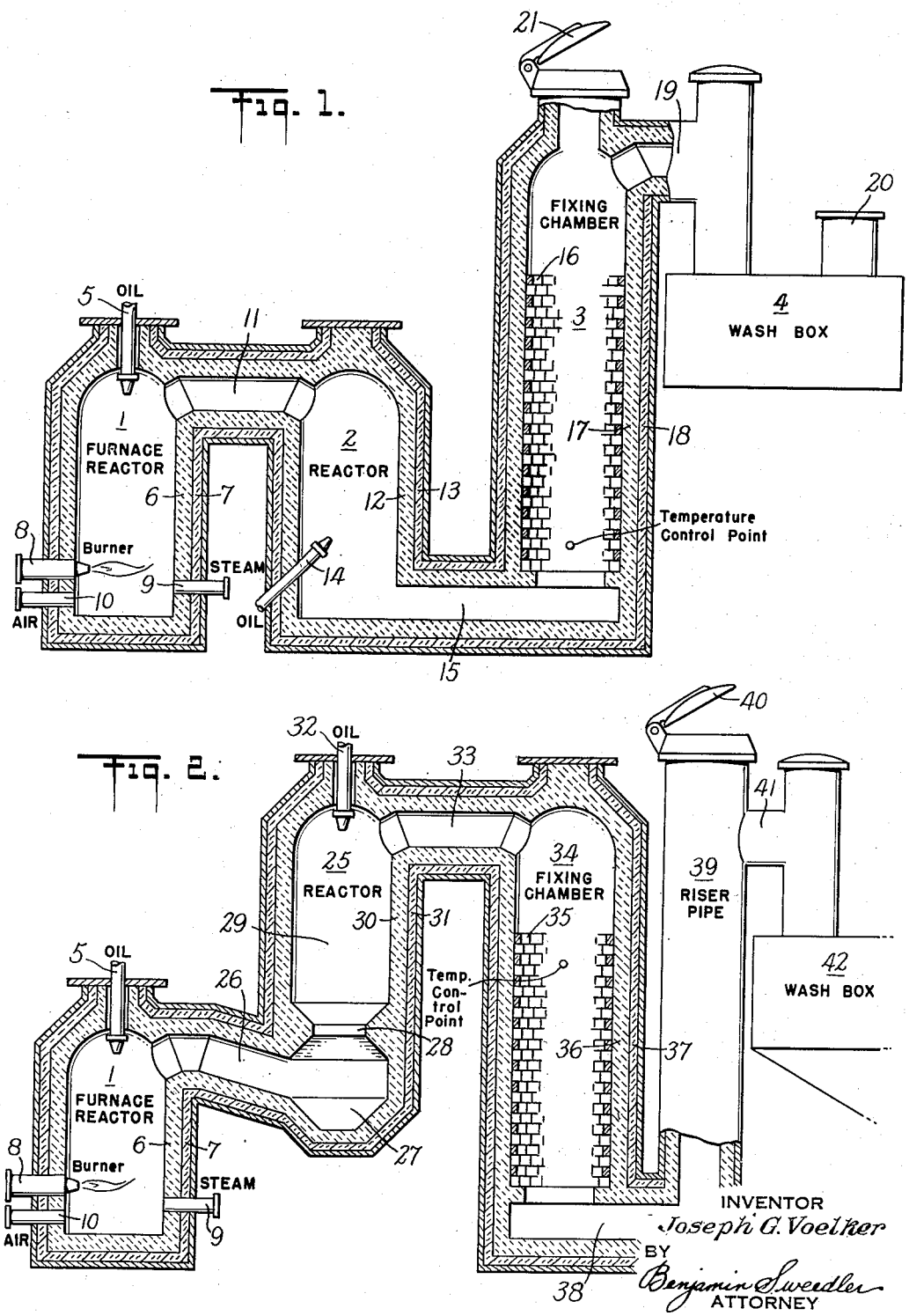

2,700,602

PROCESS FOR PRODUCING A NATURAL GAS SUBSTITUTE FROM HYDROCARBON OIL

Joseph G. Voelker, Poughkeepsie, N. Y., assignor to Allied Chemical & Dye Corporation, New York, N. Y., a corporation of New York Application July 25, 1951, Serial No. 238,532

9 Claims. (Cl. 48—214)

This invention relates to the production of combustible gas having the characteristics of natural gas and which can thus be used as a substitute for natural gas or can be blended with natural gas to take care of peak demands from a natural gas system, and this without the necessity of re-adjusting burner appliances which have been set for the satisfactory burning of natural gas. Such combustible gas should have a B. t. u. per cubic foot of from about 800 to about 1100, preferably about 1050, and a specific gravity (air=1) between about .6 and .8, preferably about .68, and is hereinafter termed a high B. t. u. low gravity gas. All numerical B. t. u. references hereinafter are to B. t. u. per cubic foot of gas.

Natural gas has been and is being introduced in certain localities remote from natural gas fields as a relatively low cost fuel for domestic and industrial consumption replacing manufactured gas, particularly carbureted water gas. To supply such localities with natural gas, pipe lines necessarily extending vast distances are employed. The length of these pipe lines and other factors involved in the construction and maintenance thereof preclude the construction of parallel lines as standbys to avert cessation of delivery because of pipe line failure or to augment the normal capacity of the line to meet peak demands. Accordingly, many gas utilities are confronted with the problem of providing standby equipment for manufacturing a natural gas substitute having substantially the same combustion characteristics as natural gas, so that it can be burned efficiently in burner appliances set for the satisfactory burning of natural gas. Many of these gas utilities have carbureted water gas equipment, which, however, can no longer be used to produce carbureted water gas, because such gas cannot be burned satisfactorily with the same burner adjustments as natural gas.

Oil gas, i. e., gas made by cracking oil, has been suggested as a natural gas substitute. As heretofore produced oil was introduced on to hot checkerbrick or on to a thick compact layer of small ceramic particles, sometimes called a carbon filtering screen, to effect cracking of the oil. Among the disadvantages of such processes may be mentioned:

1. Carbon deposits, particularly when using low grade hydrocarbon oils as the charging stock, build up on the checkerbrick or the so-called carbon filtering screen, which deposits cannot readily be burned off or require interruption of the gas making operation to effect their removal with consequent diminution of the capacity of the gas making equipment. In some cases when using low grade hydrocarbon oils the amount of carbon and carbonaceous deposits produced during the cracking of the oil may be so large as to soon choke up the apparatus and render it necessary to stop the gas making operation to remove the same.

2. The checkerbrick and/or the ceramic particles of the so-called carbon filtering screen tend to crack and spall in use requiring replacement which adds to the cost of producing the combustible gas.

3. A smoke nuisance due to release of smoke from the equipment into the atmosphere is created.

4. Tars which present emulsion problems when the tars are removed from the gas by passing the gas through the aqueous medium in the washbox frequently result.

5. The B. t. u. and specific gravity of the gas produced at times is not close enough to that of the natural gas replaced by or blended with the oil gas to permit satisfactory burning in appliances set for the burning of natural gas. In other words, the gas is not of uniform quality but at times that produced during one period of operation differs substantially from that produced during another period of operation. This results in complaints by consumers and may necessitate re-adjustment of the appliances.

6. The gas has an objectionable odor so much so that the small amount of gas which escapes when a gas appliance is turned on is found highly objectionable by the consumer.

The above noted disadvantages are particularly acute when low grade hydrocarbon oils, such as heavy residuums or bunker C oil having a Conradson carbon number in excess of 4, hereinafter referred to as heavy oils, are used as the oil cracked to produce the oil gas.

It is an object of this invention to provide a process of making a high B. t. u. low gravity gas, which process can be carried out in existing 3-shell carbureted water gas equipment with little modification of such equipment.

Another object is to provide such process which is free of the above noted objectionable features of prior known oil gas processes and this even though heavy oils are used as the charging stock.

Still another object of this invention is to provide such process of making a high B. t. u. low gravity gas, which process is of exceptional flexibility in that it can be operated efficiently employing gas oil, oil residuums and heavy oils as the charging stock.

Other objects and advantages of this invention will be apparent from the following detailed description thereof.

In accordance with this invention a process of producing high B. t. u. low gravity gas is provided, which process can be carried out in existing 3-shell carbureted water gas equipment involving a generator, carburetor and superheater located in separate and detached shells and connected in series with little modification of such equipment. The chief modifications required are to omit the grate and fuel bed from the generator, provide this unit with a fluid fuel inlet at its base and an oil inlet at its top and modify the carburetor, if necessary, so that the oil introduced therein may be vaporized and cracked in free space by radiant heat. Preferably, the carburetor is also modified, particularly when employing heavy oil as the feed stock, so that the oil inlet is disposed near one end of this unit and positioned to introduce the oil in a direction countercurrent to the flow of gas therethrough. The superheater unit usually will require no modification. Thus, when an existing 3-shell carbureted water gas set is modified to practice the process of this invention, it comprises (a) a refractory lined chamber, the interior of which is free, i. e., entirely devoid of checkerbrick, fuel bed, or other solid impediment to gas flow and which has fluid fuel, air and steam inlets at its base and a gas oil inlet at its top, (b) a second refractory lined chamber communicating with the top of the aforementioned chamber the interior of which second chamber in the preferred embodiment is free, i. e., devoid of checkerbrick or other obstructions to the flow of gas therethrough and which is provided with an oil inlet preferably disposed to introduce the oil in a direction countercurrent to the flow of gas therethrough, and (c) a third refractory lined chamber containing checkerbrick and communicating with the second-mentioned chamber and a washbox. This third refractory lined chamber may be equipped with a stack valve or may communicate with a stack or riser pipe. For convenience the three chambers above noted will be identified herein as a furnace reactor, reactor and fixing chamber, respectively.

The process of this invention involves chiefly alternating heating and gas making steps. During the heating step any suitable fluid fuel, such as tar, hydrocarbon oils including heavy oils such as bunker C or combustible gas is introduced along with air into the base of the furnace reactor and completely burned in its flow up through the furnace reactor, the products of combustion passing from the furnace reactor into and through the reactor and fixing chamber and flowing from the fixing chamber into the stack. When the set has been thus heated to the desired gas making temperature, this heating step is discontinued. Oil which may be gas oil, residuum gas enrichment oil or a heavy oil is then introduced into the top of the furnace reactor and also into the reactor while a stream of steam is introduced into the base of the furnace reactor and flows up therethrough. Thus, the oil is vaporized and cracked in a steam atmosphere in free space in the furnace reactor by radiant heat from the refractory lined walls of this unit. The resultant mixture of oil gas and steam flows into the reactor. The oil introduced into the reactor is vaporized and cracked in this atmosphere of oil gas and steam in free space within the reactor by radiant heat emanating from the refractory lined walls of the reactor. The resultant gas mixture flows over the checkerbrick in the fixing chamber where the gas is fixed. From the fixing chamber the gas flows through the washbox, then through the by-product recovery equipment and into the holder or gas distribution system.

A major portion of the hydrocarbon charging stock is introduced into the reactor and a minor portion into the furnace reactor. Preferably from 1.5 to 5 volumes of charging stock are introduced into the reactor for each volume simultaneously introduced into the furnace reactor.

The high B. t. u. low gravity gas operations of this invention involve a number of important advantages over prior oil gasification processes and apparatus among which may be mentioned:

1. A gas of uniform quality, with particular reference to the B. t. u. and specific gravity, results so that the gas can be used as a substitute or replacement for natural gas without requiring re-adjustment of burner appliances set for burning natural gas.

2. The gas produced does not have an objectionable odor.

3. The operation is smokeless with consequent elimination of the smoke nuisance.

4. Hot spots throughout the set are minimized, if not completely eliminated.

5. Cracking and spalling of the refractory lining in the furnace reactor, reactor and fixing chamber and checkerbrick within the latter unit are minimized resulting in generally longer life of the parts of the set and less repair of and maintenance charges for the set.

6. Increase in capacity particularly as compared with prior procedures involving the utilization of checkerbrick containing chambers for vaporizing and cracking oil.

7. The tars removed from the gas in the washbox have substantially less tendency to form emulsions, thus greatly simplifying the handling of these tars.

While the reasons for the advantageous results achieved by this invention are not fully understood there is good reason to believe they are largely attributable to the following factors.

(a) In the process of this invention the charging stocks including heavy oils while in the liquid phase are not brought into contact with hot refractory material, such as checkerbrick or the ceramic material in a so-called carbon filtering screen. Such refractory material acts as a catalyst to catalyze the polymerization of unsaturated hydrocarbons produced as a result of the cracking, which polymerization results in the formation of tars, pitches, smoke forming and odoriferous constituents. Moreover, when the charging hydrocarbon stock while in the liquid phase is brought into contact with hot refractory material, the molecules close to the hot surface are overcracked and those relatively remote are undercracked. Hence, non-uniform heating results with consequent formation of objectionable tars, smoke forming and odoriferous constituents. In the process of this invention the vaporization and cracking of the charging stock is carried out in free spaces by radiant heat. Uniform heating of the stock accordingly results and substantially no polymers attributable to the above noted catalytic action of hot refractory material are produced.

(b) As is well known, the rate of cracking increases with temperature increases. Employing radiant heat as the source of heat for effecting cracking it is possible to operate at higher temperatures. Heat transfer rates are considerably greater with radiant heat as compared with conducted or convected heat, i. e., hydrocarbon oil subjected to radiant heat vaporizes or cracks more quickly than when such oil is brought into contact with hot solid surfaces, and the transfer of the heat to the oil is effected chiefly by conduction and convection. These factors are responsible for increase in capacity of the process and apparatus embodying this invention. Furthermore, the checkerbrick or refractory screen takes up space and impedes the flow of gas and thus results in a further decrease in the capacity of the gas making equipment.

(c) Charging stock is introduced into the reactor in amount from 1.5 to 5 times the amount introduced into the furnace reactor. Hence, both of these units of the set are utilized most efficiently in effecting vaporization and cracking of the hydrocarbon oil. The use of both of these units for effecting vaporization and cracking utilizing radiant heat emanating from the walls of these two units provides maximum surface area from which radiant heat is obtained for effecting the vaporization and cracking and in which unconsumed carbonaceous deposits may collect without impeding gas flow.

(d) In the process of this invention carbon and carbonaceous material concomittently produced during the make runs are consumed by reaction with steam in both the furnace reactor and reactor to produce blue gas. Unconsumed carbonaceous material collects chiefly on the walls of the empty furnace reactor and reactor leaving the vapors and gas which exit from the reactor substantially free of solid carbonaceous material and liquid oil. The carbon and carbonaceous material which deposit on the walls in part are consumed in the water gas reaction during the make runs and also during the subsequent heating steps so that they do not build up to the point where they interfere with gas flow through the set. Hence, the flow of the make gas through the apparatus is not impeded by such carbon and carbonaceous material, thus maintaining high throughputs through the apparatus and reducing shut downs for cleaning.

(e) As the gas exiting from the reactor is substantially free of carbon and carbonaceous material, substantial depositions of such material on the checkerbrick in the fixing chamber does not take place. Accordingly, rapid deterioration of the checkerbrick, which normally requires frequent replacement due, it is believed, to thermal shock resulting from direct impingement of the carbon on the checkerbrick or the burning of carbon from the checkerbrick with consequent formation of localized hot spots is avoided.

(f) In the process of this invention the heating gases, i. e., the products of combustion and the make gas both flow through the set in one and the same direction. When employing a steam purge or run for removing carbonaceous depositions on the walls of the furnace reactor and reactor, which may be necessary occasionally particularly when employing heavy oils as the charging stock, the steam and the gaseous products produced in the carbon removing run flow in the same direction through the set as the heating gas and make gas. In other words, there is a uni-directional flow through the set. This makes for relatively small changes in temperature to which each portion of the set is subjected in operation. Cracking and spalling of the refractory lining and checkerbrick within the set, generally longer life of the set and less repair and maintenance charges for the set consequently result. Furthermore, the uni-directional flow permits practice of the process in equipment employing unobstructed and permanently free passageways connecting the units, thus increasing the capacity of the equipment in that it eliminates the necessity for shutting down to clean, adjust or replace the valves, such as hot valves, employed in other oil gas making equipment.

This invention will be more fully described in connection with the accompanying drawing Figure 1 of which discloses a preferred embodiment of a gas generating set for practicing this invention; and Figure 2 discloses a modified form of gas generating set for practicing this invention.

Referring to Figure 1 of the drawing there is shown a gas generating set comprising a furnace reactor 1, a reactor 2, a fixing chamber 3 and a washbox 4. The furnace reactor 1 differs from the generator of a conventional water gas set chiefly in that it does not contain a grate for supporting a fuel bed and has at its top an oil inlet 5. Like such generator it has a refractory lining 6 of fire brick or other high temperature heat resistant material separated from the outer metal walls by a layer of heat insulation 7. The combined thickness of the refractory lining 6 and heat insulation layer 7 is about a foot. The furnace reactor is provided at its base with a burner 8 for supplying fluid fuel, such as tar, low grade hydrocarbon oil including bunker C oil, gas, etc. to the base of the generator. It is also equipped with a steam inlet 9 and an air inlet 10 at its base.

The top of the furnace reactor communicates through an unobstructed permanently free refractory lined passageway 11 with the top of reactor 2. This reactor in all essential respects corresponds to the carburetor of a conventional water gas set and is provided with a refractory lining 12 separated from the outer metal walls by a layer of heat insulation 13. The combined thickness of the refractory lining 12 and insulating layer 13 is approximately one foot. Reactor 2, it will be noted, is devoid of checkerbrick and is completely unobstructed for flow of gas therethrough. It is provided with an oil inlet 14 disposed near its base for introducing the charging stock in a direction countercurrent to the flow of gas through the reactor.

Reactor 2 communicates with the fixing chamber 3 by means of a permanently free refractory lined passageway 15. Fixing chamber 3 in all essential respects corresponds to a superheater of a conventional water gas set. It may contain the usual refractory material, such as checkerbrick 16, e. g., about 40 courses with the individual brick disposed for flow thereover, each checkerbrick being, for example, 4½ inches thick, and has a refractory lining 17 separated from the metal walls by a layer of heat insulation 18. The thickness of refractory lining 17 and heat insulation 18 may be the same as the thickness of these materials in the reactor and furnace reactor.

Fixing chamber 3 is connected with washbox 4 through an angle connection 19. Washbox 4 is equipped with a gas off-take 20 leading to by-product recovery equipment, not shown. Fixing chamber 3 is also provided with a stack valve 21.

The dimensions of the furnace reactor, reactor and fixing chamber may be substantially the same as in the case of the generator, carburetor and superheater, respectively, of existing carbureted water gas sets. Thus, the inside diameter of the furnace reactor may be from about 3 feet to about 10 feet, the over-all height from about 14 feet to 19 feet. The reactor may have an inside diameter of from 3 to 10 feet and an over-all height of from 14 to 21 feet. The fixing chamber may have an inside diameter of from 2 to 10 feet and an over-all height of from 21 to 32 feet. In general, the smaller the inside diameter of each unit within the range for that unit above noted, the shorter the height within the height range above noted for that unit. Also the furnace reactor and reactor are preferably of about the same height and the fixing chamber of substantially greater height. These dimensions result in a surface area of refractory lining from which radiant heat emanates effecting vaporization and cracking of the charging stock including heavy oil in the furnace reactor and reactor, which area results in most efficient vaporization and cracking of the charging stock.

Figure 2 discloses gas making equipment of the type similar to existing carbureted water gas sets for practicing the so-called reverse flow water gas process. Such carbureted water gas set is disclosed, for example, in United States Patent 2,118,096, granted May 24, 1938.

In the set of Figure 2 the furnace reactor is of the same construction and design as that of Figure 1, and, accordingly, like parts thereof have been identified by like reference characters. Furnace reactor 1 is connected with the base of a reactor 25 by means of a permanently free and unobstructed refractory lined passageway 26. This passageway 26 leads into a dust collecting chamber 27 disposed at the base of reactor 25, which chamber may be provided with a suitable closure (not shown) for removing dust therefrom from time to time. An orifice or restricted passageway 28 separates the dust collecting chamber 27 from main portion 29 of the reactor. Orifice 28, desirably circular in shape, has the function of effecting thorough mixing of the gases passing therethrough and of also imparting a high velocity to these gases sufficient to prevent settling of solid carbonaceous material from portion 29 into the dust collecting chamber 27. Reactor 25 has a refractory lining 30 separated from the outer metal walls by a layer of heat insulation 31. The combined thickness of the refractory lining 30 and 31 may be approximately one foot, except where the orifice 28 is positioned. In this area the refractory lining 30 is thickened as shown in the drawing to form the orifice 28. Disposed at the top of the reactor 25 is an oil inlet 32 positioned to spray the charging stock in a downward direction countercurrent to the upward flowing stream of gas passing through the reactor.

Reactor 25 communicates through a permanently free and unobstructed refractory lined passageway 33 with a fixing chamber 34 containing a body of checkerbrick 35. This fixing chamber 34 has a refractory lining 36 separated from the metal walls thereof by a layer of heat insulation 37. The combined thickness of the refractory lining 36 and heat insulation layer 37 is about a foot. The base of fixing chamber 34 communicates through a refractory lined passageway 38 with a riser pipe or stack 39 equipped with a stack valve 40. A gas off-take 41 leads from the stack 39 to a washbox 42 which may be of any conventional type.

In general the dimensions of the set of Figure 2 may be about the same as that of Figure 1, except that the reactor of Figure 2 will usually have a greater height of about two feet or more to accommodate the dust collecting chamber 27. Thus, the over-all height of the reactor may be from about 16 to about 23 feet.

From the above description of the sets of Figures 1 and 2 it will be appreciated that existing carbureted water gas equipment can readily be modified to practice the process of this invention. Substantially all that is required is to omit the grate and fuel bed from the generator, equip the generator with an oil inlet at its top and a fluid fuel burner at its base and modify the carburetor, if necessary, so that it corresponds with the constructions herein disclosed. In the case of existing 3-shell carbureted water gas reverse flow sets, the only modification required is to omit the grate and fuel bed from the generator, provide the latter with a fluid fuel burner at its base and an oil inlet at its top, modify the carburetor in the event it contains a substantial number of layers of checkerbrick to omit some or all of these layers, desirably, provide it with an orifice corresponding to orifice 28, and eliminate the back run pipe and valve controlling flow through the set. It will be understood that, while an important feature of this invention is that it may be readily carried out in existing 3-shell carbureted water gas equipment with only minor modifications in such equipment, the invention is not limited thereto and may be practiced in new equipment built for that express purpose.

It is standard practice in the combustible gas generating art to control the gas making operation in accordance with temperature conditions at a selected point in the set. In the practice of this invention the gas making operation is controlled in accordance with temperature conditions at a point at or near the inlet to the fixing chamber; this point is indicated on the drawing by the legend "Temperature Control Point" and is hereinafter referred to as the control point.

In accordance with this invention the set is first heated until the temperature at the control point is within the range of 1400° to 1800° F.; operating with gas oil or light residuum the temperature at this control point desirably is from 1400° to 1600° F.; with heavy oils use temperatures at the control point may be as high as 1800° F. This is accomplished by turning on the burner 8, supplying enough air through the air inlet 10 to support complete combustion of the fluid fuel. In the modification of Figure 1, the products of combustion flow up through the furnace reactor 1, down through reactor 2, up through fixing chamber 3, exiting through the open stack valve 21. In the modification of Figure 2, the products of combustion flow up through the reactor 25, down through the fixing chamber 34, through the stack or riser pipe 39, exiting through the open stack valve 40. This step may be from 80 to 120 seconds' duration.

The heating step is preferably followed by a blow run of from 1 to 15 seconds' duration during which the products of combustion generated by burning the fluid fuel at the base of the reactor, pass from the fixing chamber into and through the washbox, the stack valve being closed during this blow run. The blow run produces diluent gas for diluting the make gas when it is desired to reduce the B. t. u. of the make gas. This step may, of course, be omitted when a higher B. t. u. gas is desired.

Next a steam purge may take place of from 2 to 10 seconds' duration. Steam is admitted to the base of the furnace reactor 1, flows up therethrough and, in the modification of Figure 1, down through the reactor, up through the fixing chamber 3, exiting through the open stack valve 21. In the modification of Figure 2, the steam passes up through the reactor 25, down through the fixing chamber 34, up through the riser pipe 39, exiting through the open stack valve 40. Products of combustion within the set are thus purged therefrom.

The make run follows. Liquid hydrocarbon, which may be heavy oil, gas oil, or other hydrocarbon enrichment material in the modification of Figure 1 is admitted simultaneously through oil inlet 5 to the top of the furnace reactor 1 and oil inlet 14 into the reactor 2. Steam is admitted at 9 to the base of the furnace reactor 1. The oil introduced through 5 is vaporized and cracked in the free space in the furnace reactor by radiant heat emanating from the refractory lining of this furnace reactor in the presence of the steam passing therethrough. This steam is superheated somewhat in its flow up through the furnace reactor and sweeps out the oil gas produced in this unit as fast as this gas is generated. Also it reacts with carbonaceous material produced in the vaporization and cracking of the oil to produce blue gas. The mixture of steam and gas from the furnace reactor 1 enters into the top of the reactor 2 and flows downwardly therethrough. Charging stock introduced through inlet 14 in a direction countercurrent to the flow of the gas through this reactor is vaporized and cracked in the free space in this reactor by radiant heat emanating from the refractory lined walls of the reactor in the atmosphere of gas and steam passing therethrough. Unconsumed carbonaceous deposits formed in the furnace reactor and reactor settle more or less uniformly onto the walls of these units. The gas leaving the reactor 2 is substantially free of such carbonaceous deposits. This gas passes up through the checkerbrick in the fixing chamber 3 where it is fixed. From the fixing chamber 3, the resulting high B. t. u. low gravity gas passes into the washbox 4, exiting therefrom through the off-take 20.

The make step in the equipment of Figure 2 is substantially the same as hereinabove described, except that the mixture of gas and steam from furnace reactor 1 flows up through the reactor 25, the velocity of this gas mixture being increased as it flows through the orifice 28, thus preventing settling of carbon and carbonaceous material into the dust collecting chamber 27, except for a small amount of very fine dust. The resultant gas stream substantially free of such carbonaceous material flows downwardly through the fixing chamber 34, up through the riser pipe 39 through the connection 41 into the washbox 42.

The make step is continued until the temperature at the control point is from about 1300° to about 1500° F. Starting with a temperature at the control point of about 1400° F. the make step is continued until the temperature drops about 100° F., whereas starting at a higher temperature in the upper portion of the range, say at about 1800° F., the make step may be continued until the temperature at the control point drops as much as 300° F. This make step usually is from 70 to 100 seconds' duration. Thus, in accordance with this invention the temperature at the control point at the end of the heating step and at the beginning of the make step is from 1400° to 1800° F. and the temperature at the end of the make step is from 1300° to 1500° F. respectively. In general the temperatures in the top of the furnace reactor and reactor are about 400° to 500° F. higher than the temperature at the control point.

Following this make step, the oil sprays leading into the furnace reactor and reactor are shut off and steam is introduced into the base of the furnace reactor. This steam flows up through the furnace reactor into and through the reactor and fixing chamber purging the set from residual gas and serving to remove carbonaceous deposits on the walls of the furnace reactor and reactor. The steam gas mixture exits from the fixing chamber into the washbox. This steam purge may be of 20 to 50 seconds' duration. This completes one cycle of steps of the preferred process; the steps are repeated in each succeeding cycle.

If tenacious deposits of carbonaceous material build up on the walls of the furnace reactor and reactor, as may occasionally take place particularly when using heavy oils as the charging stock, a run is carried out to remove such deposits. This run involves introducing air through inlets 9 in the furnace reactor and passing it up through this unit and down through the reactor. The air is introduced in amount to support complete combustion of the carbonaceous deposits in the set. The products of combustion thus produced desirably are vented through the stack valve to the atmosphere. This run, when used, may precede or follow the heating step.

It will be noted this invention provides a process of making a high B. t. u. low gravity gas which can be carried out in existing 3-shell carbureted water gas equipment with little modification of such equipment. Further, the process of this invention is free of the above noted disadvantages of prior oil gas processes and is of exceptional flexibility in that it can be operated efficiently employing gas oil, residuums or heavy oils as the charging stock.

Since certain changes in carrying out the above process may be made without departing from the scope of this invention, it is intended that all matter contained in the above description or shown in the accompanying drawing shall be interpreted as illustrative and not in a limiting sense. Thus, while it is preferred to have the introduction of oil into the reactor in a direction countercurrent to the flow of gas therethrough, the oil may be introduced in a cocurrent direction relative to the gas flow through this unit. Furthermore, while it is preferred to have the reactor completely unobstructed and devoid of checkerbrick, if desired, a few layers of such checkerbrick may be provided at the exit end of the reactor to initiate fixing of the make gas. It is important, however, to have such layers of checkerbrick disposed so that oil while in the liquid phase does not contact the same.

This application is generic to the invention disclosed and claimed in my copending application Serial No. 238,531 filed the same day as this application.

What is claimed is:

1. The process of making a high B. t. u. low gravity combustible gas having the characteristics of natural gas in a three-shell gas generating set in which one shell is a refractory lined chamber, occupying substantially the entire shell, said chamber having the interior thereof throughout its length devoid of checkerbrick and constituted of a free space for unobstructed flow of gas therethrough, and for the cracking of oil in said free space, a second shell is a refractory lined chamber occupying substantially the entire extent of said second shell, said chamber communicating with the first-mentioned chamber and having in the portion thereof communicating with the first-mentioned chamber a large unobstructed free space devoid of checkerbrick for the unobstructed flow of gas therethrough and for the cracking of oil in said free space, and the third shell is a fixing chamber extending substantially the full length of said third shell, containing refractory material with voids therebetween and communicating with said second shell, which process comprises heating said chambers by burning a fluid fuel introduced into the first-mentioned chamber and passing the resultant products of combustion through the first-mentioned chamber and through the other two chambers to heat said chambers to gas-making temperatures, and generating said high B. t. u. low gravity gas by passing steam into and through the first-mentioned chamber, introducing hydrocarbon oil into said free space in the first-mentioned chamber and completely vaporizing said hydrocarbon oil thus introduced in the free space in said first-mentioned chamber by radiant heat in the presence of said steam passing therethrough, passing the resultant mixture of oil vapors and steam through the second-mentioned chamber, simultaneously with the introduction of the oil into the first-mentioned chamber, introducing hydrocarbon oil into the second-mentioned chamber in amount at least 1.5 times the amount of hydrocarbon oil introduced into the first-mentioned chamber, completely vaporizing the oil thus introduced into the second-mentioned chamber while in said free space in said second-mentioned chamber by radiant heat and in the presence of oil vapors and steam passing from the first-mentioned chamber through the second-mentioned chamber, and passing the resultant mixture of oil vapors and steam over the hot refractory material in said fixing chamber to produce the combustible gas.

2. The process as defined in claim 1, in which all of the air required for complete combustion of said fluid fuel is introduced at one end of the first-mentioned chamber, the resultant products of combustion are passed throughout the length of the first-mentioned chamber and through the other two chambers to heat said chambers to gas-making temperatures and without adding additional air to said products of combustion flowing through said chambers, the hydrocarbon oil is a heavy oil and from one-and-a-half to five times the amount of heavy oil is introduced into the second-mentioned chamber as is introduced into the first-mentioned chamber.

3. The process as defined in claim 1, in which the hydrocarbon oil is a heavy oil, from one-and-a-half to five times the amount of heavy oil is introduced into the second-mentioned chamber as is introduced into the first-mentioned chamber, the heavy oil in the first-mentioned chamber is introduced in a direction countercurrent to the flow of steam therethrough, the heavy oil in the second-mentioned chamber is introduced in a direction countercurrent to the flow of steam and oil vapors therethrough, the heating step is continued until the temperature near the inlet end of the fixing chamber is within the range of 1400° to 1800° F., and the gas making step is continued until the temperature near the inlet end of the fixing chamber drops at least 100° F. and is within the range of 1300° to 1500° F.

4. The process of making a high B. t. u. low gravity combustible gas having the characteristics of natural gas in a three-shell gas generating set in which one shell is a refractory lined chamber, occupying substantially the entire shell, said chamber having the interior thereof throughout its length devoid of checkerbrick and constituted of a free space for unobstructed flow of gas therethrough, and for the cracking of oil in said free space, a second shell is a refractory lined chamber occupying substantially the entire extent of said second shell, the top of said chamber communicating with the top of the first-mentioned chamber and having the interior thereof throughout its length devoid of checkerbrick and constituted of a free space for unobstructed flow of gas therethrough and for the cracking of oil in said free space, and the third shell is a fixing chamber extending substantially the full length of said third shell, containing refractory material with voids therebetween and having its base communicating with the base of said second shell, which process comprises heating said chambers by burning a fluid fuel introduced into the base of said first-mentioned chamber and passing the resultant products of combustion up through the first-mentioned chamber, down through the second-mentioned chamber and up through the fixing chamber to heat said chambers to gas-making temperatures, and generating said high B. t. u. low gravity gas by passing steam into the base of and up through the first-mentioned chamber, introducing hydrocarbon oil into the top of the first-mentioned chamber and completely vaporizing said hydrocarbon oil thus introduced in the free space in said first-mentioned chamber by radiant heat in the presence of said steam passing therethrough, passing the resultant mixture of oil vapors and steam into the top of and down through the second-mentioned chamber, simultaneously with the introduction of the oil into the first-mentioned chamber, introducing into the top of the second-mentioned chamber hydrocarbon oil in amount at least 1.5 times the amount of hydrocarbon oil introduced into the first-mentioned chamber, completely vaporizing the oil thus introduced into the second-mentioned chamber while in said free space in said second-mentioned chamber by radiant heat and in the presence of oil vapors and steam passing from the first-mentioned chamber through the second-mentioned chamber, and passing the resultant mixture of oil vapors and steam up through and over the hot refractory material in said fixing chamber to produce the combustible gas.

5. The process as defined in claim 4, in which the hydrocarbon oil is a heavy oil and from one-and-a-half to five times the amount of heavy oil is introduced into the second-mentioned chamber as is introduced into the first-mentioned chamber.

6. The process as defined in claim 4, in which the hydrocarbon oil is a heavy oil, from one-and-a-half to five times the amount of heavy oil is introduced into the second-mentioned chamber as is introduced into the first-mentioned chamber, and the heating step is continued until the temperature at the base of the fixing chamber is within the range of 1400° to 1800° F., and the gas making step is continued until the temperature at the base of the fixing chamber drops at least 100° F. and is within the range of 1300° to 1500° F.

7. The process of making a high B. t. u. low gravity combustible gas having the characteristics of natural gas in a three-shell gas generating set in which one shell is a refractory lined chamber, occupying substantially the entire shell, said chamber having the interior thereof throughout its length devoid of checkerbrick and constituted of a free space for unobstructed flow of gas therethrough, and for the cracking of oil in said free space, a second shell is a refractory lined chamber occupying substantially the entire extent of said second shell, the base of said chamber communicating with the top of the first-mentioned chamber and having the interior thereof throughout its length devoid of checkerbrick and constituted of a free space devoid of checkerbrick for the unobstructed flow of gas therethrough and for the cracking of oil in said free space, and the third shell is a fixing chamber extending substantially the full length of said third shell, containing refractory material with voids therebetween and having its top communicating with the top of said second shell, which process comprises heating said chambers by burning a fluid fuel introduced into the first-mentioned chamber and passing the resultant products of combustion up through the first-mentioned chamber, up through the second-mentioned chamber and down through the fixing chamber to heat said chambers to gas-making temperatures, and generating said high B. t. u. low gravity gas by passing steam into the base of and up through the first-mentioned chamber, introducing hydrocarbon oil into said free space in the top of said first-mentioned chamber and completely vaporizing said hydrocarbon oil thus introduced in the free space in said first-mentioned chamber by radiant heat in the presence of said steam passing therethrough, passing the resultant mixture of oil vapors and steam into the base of and up through the second-mentioned chamber, simultaneously with the introduction of the oil into the first-mentioned chamber, introducing into the top of the second-mentioned chamber hydrocarbon oil in amount at least 1.5 times the amount of hydrocarbon oil introduced into the first-mentioned chamber, completely vaporizing the oil thus introduced into the second-mentioned chamber while in said free space in said second-mentioned chamber by radiant heat and in the presence of oil vapors and steam passing from the first-mentioned chamber up through the second-mentioned chamber, and passing the resultant mixture of oil vapors and steam down through and over the hot refractory material in said fixing chamber to produce the combustible gas.

8. The process as defined in claim 7, in which the hydrocarbon oil is a heavy oil and from one-and-a-half to five times the amount of heavy oil is introduced into the second-mentioned chamber as is introduced into the first-mentioned chamber.

9. The process as defined in claim 7, in which the hydrocarbon oil is a heavy oil, from one-and-a-half to five times the amount of heavy oil is introduced into the second-mentioned chamber as is introduced into the first-mentioned chamber, and the heating step is continued until the temperature near the top of the fixing chamber is within the range of 1400° to 1800° F., and the gas-making step is continued until the temperature near the top of the fixing chamber drops at least 100° F. and is within the range of 1300° to 1500° F.

References Cited in the file of this patent

UNITED STATES PATENTS

| Number | Name | Date |
|---|---|---|
| 2,064,006 | Hughes | Dec. 15, 1936 |
| 2,195,465 | McIntyre et al. | Apr. 2, 1940 |
| 2,205,554 | Brandegee et al. | June 25, 1940 |
| 2,371,616 | Hall | Mar. 20, 1945 |
| 2,605,176 | Pearson | July 29, 1952 |
| 2,605,177 | Pearson | July 29, 1952 |

OTHER REFERENCES

American Gas Journal, vol. 171, No. 5, November 1949, page 1, advertisement of Soment-Solvay.